Aug. 5, 1924.
B. E. MEACHAM
1,504,068
AUTOMATIC FUEL CONTROLLER FOR BURNERS
Filed Jan. 31, 1921    2 Sheets-Sheet 1
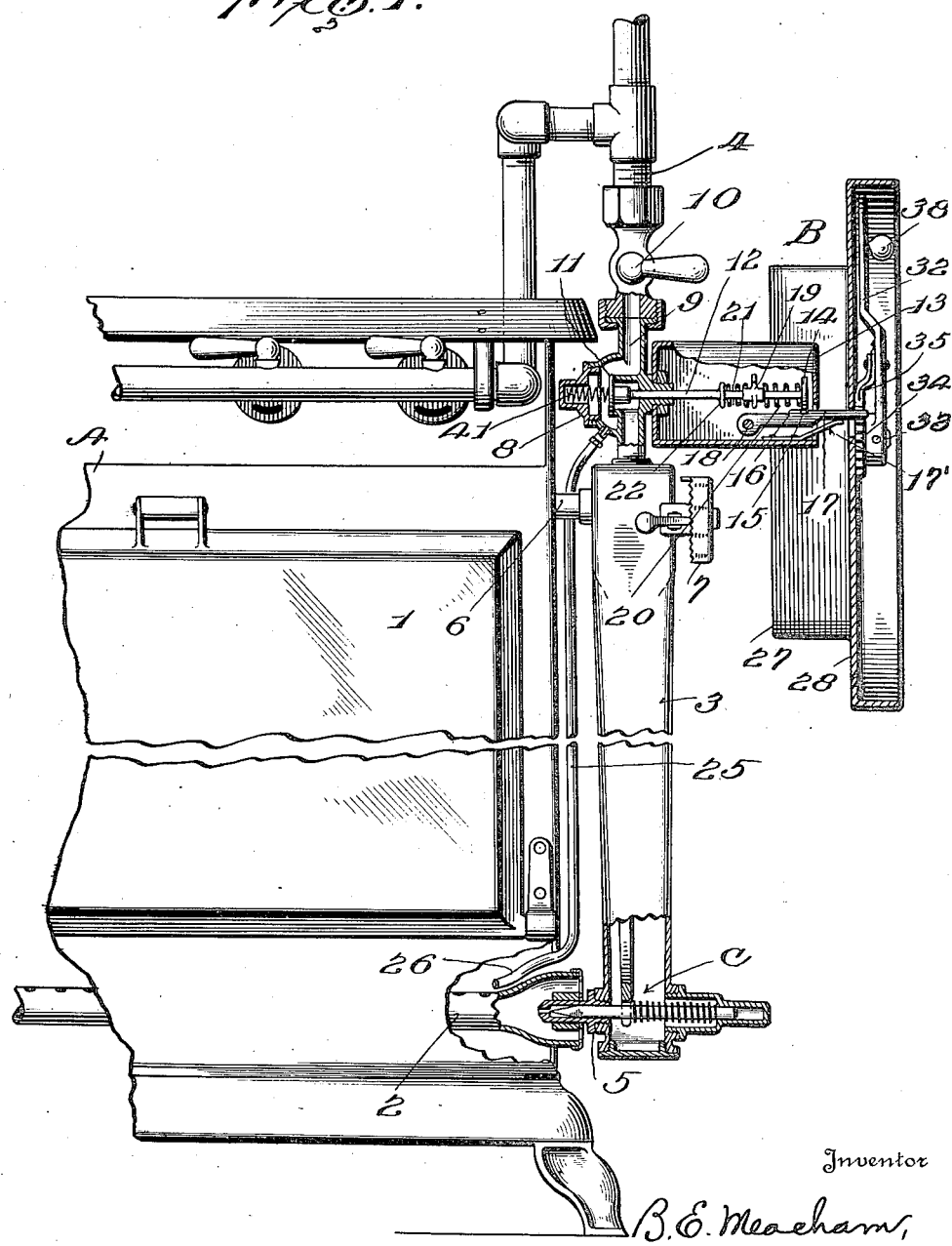

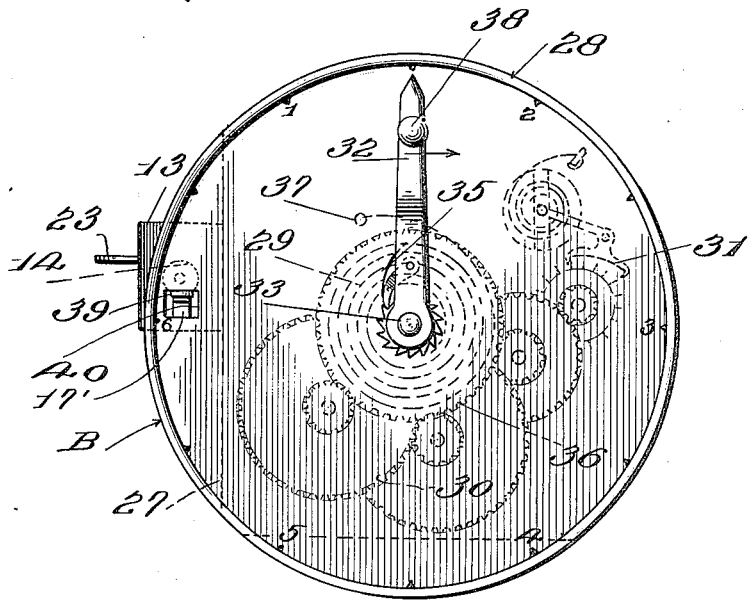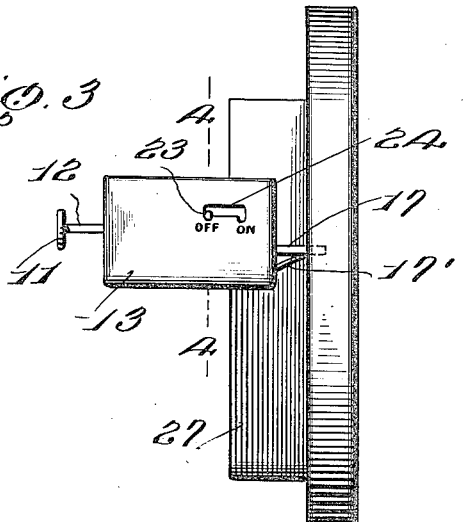

Patented Aug. 5, 1924.

1,504,068

UNITED STATES PATENT OFFICE.

BENJAMIN EDWIN MEACHAM, OF LORAIN, OHIO, ASSIGNOR TO AMERICAN STOVE COMPANY, OF ST. LOUIS, MISSOURI, A CORPORATION OF NEW JERSEY.

AUTOMATIC FUEL CONTROLLER FOR BURNERS.

Application filed January 31, 1921. Serial No. 441,237.

*To all whom it may concern:*

Be it known that I, BENJAMIN E. MEACHAM, a citizen of the United States, residing at Lorain, in the county of Lorain and State of Ohio, have invented certain new and useful Improvements in Automatic Fuel Controllers for Burners, of which the following is a specification, reference being had therein to the accompanying drawing.

This invention relates to improvements in automatic fuel controllers for burners, and is particularly intended for controlling the flow of gas to burners of gas cooking ovens.

One object of my invention is to provide means for automatically either turning on or cutting off the flow of gas to the oven burner at a predetermined time, whereby the burner may be either automatically started or extinguished at a predetermined time, according to the desire and convenience of the user.

Another object of my invention is to provide means for accomplishing the aforesaid stated results and at the same time thermostatically control the flow of the fuel to the burner, whereby a predetermined degree of heat will be maintained in the oven during the time that the burner is in operation.

A further object of my invention is to construct the mechanism so that the fuel control valve is normally closed and can be turned on at any pre-determined time, whereby a meal may be prepared and placed in the oven with the fuel valve normally closed, and the operator leave the house to return at a specified time, and the time control set for opening the valve at a predetermined time, whereby the cooking will begin and be completed when the operator returns.

Further objects of the invention will appear from the following description.

In the accompanying drawings:—

Figure 1 is a front elevation of a gas stove showing my improvement applied thereto and partly in section.

Fig. 2 is a front elevation of a time mechanism for turning on and cutting off the gas.

Fig. 3 is an edge elevation of Fig. 2.

Fig. 4 is a cross-section on the line 4—4 of Fig. 3.

Referring now to the drawings, in which the same reference characters indicate the same parts, A is the oven of a gas stove having the usual oven door 1. This oven is provided with one or more burners 2 of any desired construction.

In the embodiment of my present improvement as here shown, I employ a suitable vertically arranged housing 3, which has a fuel supply 4, and its lower end 5, communicating with the burner 2 for supplying fuel thereto. A suitable thermo member 6 extends into the oven A, and this thermo member 6, controls the flow of fuel to the burner 2 in the manner fully disclosed and explained in my Patent No. 1,236,335, dated August 7th, 1917, and my Patent No. 1,285,300, dated November 19th, 1918, to which reference is made for explanation and illustration of the operation of the thermo member, which controls the flow of gas to the burner 2. For the purpose of this present improvement, it is sufficient to say that a hand-regulating wheel or member 7 is provided as in my above-mentioned patents, whereby the thermo actuated mechanism can be set for maintaining in the oven the desired predetermined degree of heat.

A housing 8 is in communication with the fuel conduit 4, and the housing has a fuel supply conduit 9. A hand operated valve 10 is located in the fuel supply conduit whereby fuel may be turned on or off from the housing 8.

The flow of fuel or gas from the housing 8 to the conduit 4, which communicates with the housing 3, is controlled by a suitable valve 11, which has its stem 12 projecting through the housing 8 into a housing 13, which I call a valve setting housing. The outer end of the valve stem 12 is provided with a disk 14 adapted to engage either the shoulder 15, or the shoulder 16 of a combined set and trip lever 17, the inner end of the trip lever being suitably pivoted at 18. A sliding yoke or collar 19 is located on the valve stem 12 and a spring 20 is between the collar 19 and the disk 14, and a spring 21 is between the collar 19 and a pin, disk, or block 22. The collar 19 is provided with a handle 23, which passes through a slot 24 in the housing 13, and this handle 23 is adapted to be moved by hand to engage in either the notch marked "Off" or "On" for a purpose which will be presently explained.

A suitable gas conduit 25 has its upper end communicating with the housing 8 and its lower end formed into a suitable pilot burner 26, for lighting the oven burner 2, when the fuel is turned on to the latter.

A suitable clock mechanism B is located at the outer end of the housing 13 and suitably connected therewith. This clock mechanism comprises a gear housing 27 and a dial 28, having thereon suitable means indicating the hours, as here shown from 1 to 6. In the form of clock mechanism here illustrated, the operating spring 29, shown in dotted lines in Fig. 2, is located in the center and operates a suitable train of gearing 30 to a suitable escapement mechanism 31. As any desired form or arrangement of gearing and escapement mechanism may be used, it is unnecessary to further describe it here.

In the form of clock mechanism here shown, a hand 32 has its inner end attached to the shaft 33, and a ratchet wheel 34 is attached to the gear 36. A spring actuated ratchet 35 is pivoted to the hand 32 and engages the ratchet wheel 34. For the purpose of convenience, the hand 32 has an outwardly extending handle 38 by which it is manually operated.

The outer end of the trip lever 17 passes through an opening 40 in the dial 28 and is in the path of travel of the hand 32.

In operation when the hand 32 is moved in the direction indicated by arrow, it winds up the spring 29 and when released, the spring operating through the shaft 33, the handle 32, ratchet 35 causes a spring revolving action on the gear 36, setting a train of gears 30 and the escapement mechanism 31 in motion. When the hand 32 is released, it travels under spring tension in the direction opposite that indicated by arrow in Fig. 2 and will depress the trip lever 17 disengaging the disk 14, and permitting the compressed spring 21 to open the valve 11, the spring 21 being sufficiently stronger than the fine spring 41 to overcome the latter spring. From the foregoing it will be understood that the hand 32 is a combined winding, setting and tripping hand.

With the parts in the positions shown in Fig. 1, and the valve 11 being normally closed, and the setting lever 23 in the Off notch, the spring 21 is compressed so that when the tripping lever is operated by the hand 32, the valve 11 is moved to open position by the spring 21 permitting a flow of gas to the housing 3 and from thence to the burner 2. In this latter position the disk 14 on the end of the valve stem is against the notch 16 of the trip lever 17, and by moving the setting lever 23 to the On notch of Fig. 3, the spring 20 is compressed. With the valve 11 in this latter described open position and the spring 20 compressed, when the handle 32 depresses the trip lever 17, the valve 11 is caused to close, which will cut off the flow of gas to the burner 2 through the housing 3 and extinguish the burner.

When the parts are in the position shown in Fig. 1, the fuel valve 11 is normally closed the valve to be opened at some future predetermined time and it will continue to operate until the valve 10 is closed which is the main object of the invention. When the parts are set with the valve open the burner will operate for a pre-determined time, and at a pre-determined heat, and will then be closed by the setting of the handle 32, the purpose and operation of both will now be described.

The purpose of this arrangement is as follows:

When the lady of the house desires to spend the afternoon out, she places the prepared meal in the oven, the pilot 26 is lighted, the setting handle 23 is put in the Off notch, which indicates that the gas is cut off from the burner, and the supply valve 10 is opened. If she wishes to leave, say at one o'clock and to return at six, and three hours is required to cook the meal, the heat controlling wheel 7 is set to the proper degree for maintaining the heat in the oven required to cook the meal, say in three hours. This means that the timing mechanism must be set to turn on the gas at three o'clock. By turning the hand 32 to the numeral 2 on the dial 28, it will take two hours for the hand to travel to and trip the lever 17, which means that the gas will be turned on at three o'clock and the oven burner started. The thermo actuated member will maintain the desired degree of heat during its operation. When the lady returns at six o'clock the main gas supply valve 10 is closed, which extinguishes the burner 2 and the dinner is cooked and ready to be served. It will be readily understood that the operator on return can cut the flow of fuel off to the burner manually by means of setting the handle 23 in the "Off" notch of the housing 13, but of course the valve 10 would be most convenient for that purpose.

On the other hand, if it is desired to set the parts so that the burner will operate at a maintained predetermined degree of heat for a predetermined time, the setting lever 23 is put in the On notch which indicates that the gas is flowing to the burner, and, of course, the valve 11 is open. The valve 10 is opened and the burner 2 lighted.

Assuming, for instance, that the burner is to operate for three hours, the hand 32 will be moved to the numeral 3 on the dial, so that the hand 32 will depress the tripping lever 17 in three hours, causing the closing of the valve 11, by the spring 20, which is compressed when the setting lever 23 is set on the "On" notch.

From the foregoing it will be seen that the flow of gas can be cut off and the parts so set that it will start in operation at a predetermined time after the setting of the parts, and that a predetermined degree of heat will be maintained in the oven until the fuel is manually cut off. It will also be seen that the parts can be set so that the burner is operating and will continue to operate, maintaining a predetermined heat in the oven for the predetermined length of time at the expiration of which the fuel will be cut off and the burner extinguished.

It will also be understood from the foregoing description that the operation of the thermo-actuated mechanism is dependent upon the operation of the fuel valve 11, which is controlled by the timing mechanism.

It will also be understood that the thermo actuated mechanism and the time mechanism co-operate for cooking within a predetermined time, since it is necessary that the predetermined maintained heat, and the predetermined time of operation work together to produce the above described result.

I do not limit myself to the particular construction here described or illustrated, as it is one mechanical expression of my present invention, and that variations may be made therein without departing from the spirit and scope of my invention.

Having thus described my invention, what I claim and desire to secure by Letters Patent is:—

1. In a device of the character described, comprising an oven, a burner therefor, a thermostatically controlled valve for said burner, a normally closed fuel valve controlling the flow of fuel to said thermostatic valve, a member holding the said fuel valve normally closed, and a clock mechanism adapted to open the said valve at a predetermined time, for the purpose described.

2. In a device of the character described, the combination of an oven, a burner therefor, a manually set thermostatic valve for said burner, a fuel valve controlling the flow of fuel to said thermostatic valve, a lever holding said valve normally closed, and a clock mechanism adapted to move the said lever to cause said valve to open at a predetermined time, and a manually operated cut-off, the parts combined for the purpose described.

3. A combined time and thermostatic fuel control for a burner comprising a thermostatically controlled valve, a valve controlling the fuel to the thermostatic valve, means for setting the last said valve in either open or closed position, a member holding said fuel valve in either of said positions and a clock mechanism adapted to release the valve and permit it to assume the position opposite to that at which it is set.

4. A combined time and thermostatic fuel control for a burner, comprising a thermostatically operated valve, a valve controlling the fuel supply to the thermostatically controlled valve, a lever provided with two shoulders, said valve carrying means for engaging either of said shoulders for holding the valve either open or closed, oppositely acting springs acting on the valve, means for moving the valve to open or closed position, and a time mechanism adapted to operate the said lever causing the said valve to assume the position opposite to that at which it is set.

5. A combined time and thermostatic fuel control for burners, comprising a manually set thermostatically controlled fuel valve for the burner, an independently operated time controlled valve controlling the supply of fuel to the thermostatically controlled valve and means for causing the time control valve to be opened or closed by the time control, for the purpose described.

6. A combined time and thermostatic fuel control for burners, comprising a manually set thermostatically controlled fuel valve for the burner, an independently operated time controlled valve controlling the supply of fuel to the thermostatically controlled valve, a member for setting the time controlled valve either open or closed, and a member actuated by the time control for moving the time controlled valve to its position opposite to that at which it is set.

7. A combined time and thermostatic fuel control for burners, comprising a manually set thermostatically controlled fuel valve for the burner, an independently operated time controlled valve controlling the supply of fuel to the thermostatically controlled valve, means for setting the time controlled valve in its desired position, means for holding the valve in its set position, means for returning the valve to its position opposite to that at which it is set and a time controlled member operating the holding means to release the valve and permit it to return to its unseated position.

8. A combined time and thermostatic fuel control for burners, comprising a manually set thermostatically controlled fuel valve for the burner, an independently operated time controlled valve controlling the supply of fuel to the thermostatically controlled valve, means for setting the time controlled valve in its desired position, a combined holding and tripping member for holding the valve in its set position, a spring acting to move the time controlled valve to its opposite position to that at which it is set, and a time controlled member operating the combined holding and tripping member to release the valve and permit it to move to its opposite position.

9. A time fuel control for burners, comprising a burner, a fuel supply for the burner, a valve controlling the fuel supply to the burner and movable to open and closed positions, means for moving the fuel valve to either position, a holding and tripping means for the valve in either position, and a time actuated member adapted to operate the tripping means for the purpose described.

10. In a device of the character described, comprising a manually set burner valve, a conduit for the gas to said valve, a fuel valve controlling the flow of gas, a lever holding the valve closed against spring action, a clock mechanism having a hand, the lever extending in the path of travel of the clock hand, whereby the lever is depressed thus releasing the spring for permitting it to open the valve.

11. In a device of the character described, a manually set thermostatically controlled valve for a burner, a conduit communicating with the valve, a fuel actuated valve stem carrying two oppositely acting springs, a lever having two projections with which the valve stem is adapted to engage, whereby it can be set for either spring, a clock mechanism carrying a hand, the end of the lever projected in the path of travel by the clock hand, whereby it is depressed for relieving the spring.

12. In a device of the character described, comprising a manually set thermostatically controlled burner valve, a conduit in communication with the valve, a fuel valve controlling the conduit having its stem provided with a spring, a collar carried on the stem for setting the spring, a lever engaged by the stem for holding it against the action of the spring, a clock mechanism carrying a hand, the end of the lever projecting into the path of travel by the hand and actuated thereby to release the fuel valve.

13. In a device of the character described, comprising a manually set burner valve, a conduit in communication with the valve, a fuel valve controlling the said conduit, the fuel valve having on its stem two oppositely acting springs divided by a collar, means for setting the collar and thereby setting either of the springs, a lever having two shoulders with which the device engages, a clock mechanism carrying a hand, the end of the lever projecting into the path of travel by the clock hand to be actuated thereby to release the said fuel valve.

14. A device of the character described comprising a thermostatically controlled burner valve, a conduit in communication with the valve, a fuel valve controlling the conduit, the stem of the fuel valve projected and carrying a spring, a housing into which the stem projects, the stem carrying a spring, a collar having a projection extending through the housing, the housing having a notch with which the projection may engage, a lever carried in the housing and adapted to hold the valve stem against the tension of the spring, a clock mechanism carrying a hand, the end of the lever projecting in the path of travel of the clock hand for the purpose described.

15. The combination with a burner valve, of a conduit communicating with the valve, a fuel valve controlling the conduit and having its valve projecting, of a housing secured to the conduit, said housing including the enclosure for the valve stem and a clock mechanism, the valve stem carrying a spring, means for setting the spring, a lever with which the valve stem engages when the spring is set, the clock mechanism carrying a hand, and the end of the lever projecting in the path of travel by the hand, for the purpose described.

16. In a device for the purpose described, comprising an oven, a burner therefor, a manually set thermostatically controlled valve for the said burner, a manually set member for holding the said fuel valve in open or closed position, means for moving the said valve in opposite directions to closed or open position, and a manually set clock mechanism having a member movable in the path of said valve holding member for moving it and releasing the said fuel valve whereby the device may be set in either open or closed position for the purpose described, and a manually controlled valve in advance of the said fuel valves for cutting off the flow of fuel thereto.

17. In a device for the purpose described, comprising an oven, a burner therefor, a conduit connected with the said burner, a manually set thermostatically controlled valve for the said burner, a fuel valve in advance of the thermostatically controlled valve, the said fuel valve having a projecting stem, a member supported independently of the said fuel valve constructed to hold it open or closed, a spring mechanism adapted to move the said valve and stem to either open or closed position, a clock mechanism adapted to move the said member for releasing the fuel valve, for the purpose described.

18. In a device for the purpose described, comprising an oven, a burner for the said oven, a conduit connected with the said burner, a thermostatically set valve for controlling the flow of fuel to the burner, a housing projecting from the conduit in advance of the thermostatically set valve and carrying a clock mechanism, a fuel controlling valve in the said conduit, the said valve having a valve stem projecting into the said housing, means for moving the said valve and its projecting stem into open or closed position, means for holding the said valve in either of said positions, and a manually set clock mechanism adapted to actuate the said holding means for releasing the said valve.

In testimony whereof I hereunto affix my signature.

BENJAMIN EDWIN MEACHAM.